United States Patent [19]
Yokoyama

[11] Patent Number: 5,239,380
[45] Date of Patent: Aug. 24, 1993

[54] METHOD OF DRIVING A SOLID-STATE IMAGING DEVICE BY TWO-STEP SIGNAL CHARGE VERTICAL TRANSFER IN ONE HORIZONTAL BLANKING PERIOD

[75] Inventor: Toshimichi Yokoyama, Tokyo, Japan
[73] Assignee: NEC Corporation, Tokyo, Japan
[21] Appl. No.: 828,165
[22] Filed: Jan. 30, 1992
[30] Foreign Application Priority Data
  Feb. 15, 1991 [JP] Japan .................................. 3-044262
[51] Int. Cl.⁵ .......................................... H04N 5/335
[52] U.S. Cl. ............................. 358/213.22; 358/213.23
[58] Field of Search ....................... 358/213.21, 213.18, 358/213.22, 213.23, 213.25, 213.26, 213.27

[56] References Cited
U.S. PATENT DOCUMENTS 4,680,636  7/1987  Ooi .................................. 358/213.18
4,686,573  8/1987  Murayama et al. ............ 358/213.22
5,051,831  9/1991  Hashimoto .................... 358/213.11

Primary Examiner—Michael T. Razavi
Assistant Examiner—Tuan V. Ho

[57] ABSTRACT

A method of driving a solid-state imaging device, in which signal charges are read out from all light receiving members of the solid-state imaging device simultaneously and independently to the vertical CCD register of the device. The signal charges in the vertical CCD registers are transferred in two vertical transfer steps in one horizontal blanking period of time. A plurality of the light receiving members are arranged in a matrix in the vertical and horizontal directions whereas a plurality of vertical CCD registers of the device read the signal charges received through the light receiving members and transfer them in the vertical direction. A horizontal CCD register which is disposed at the ends of the vertical CCD registers transfers the signal charges received from the vertical CCD registers to an output circuit member. A first field and a second field are respectively formed in accordance with the reading and transferring operations to effect an interlace motion in the solid-state imaging device.

3 Claims, 8 Drawing Sheets

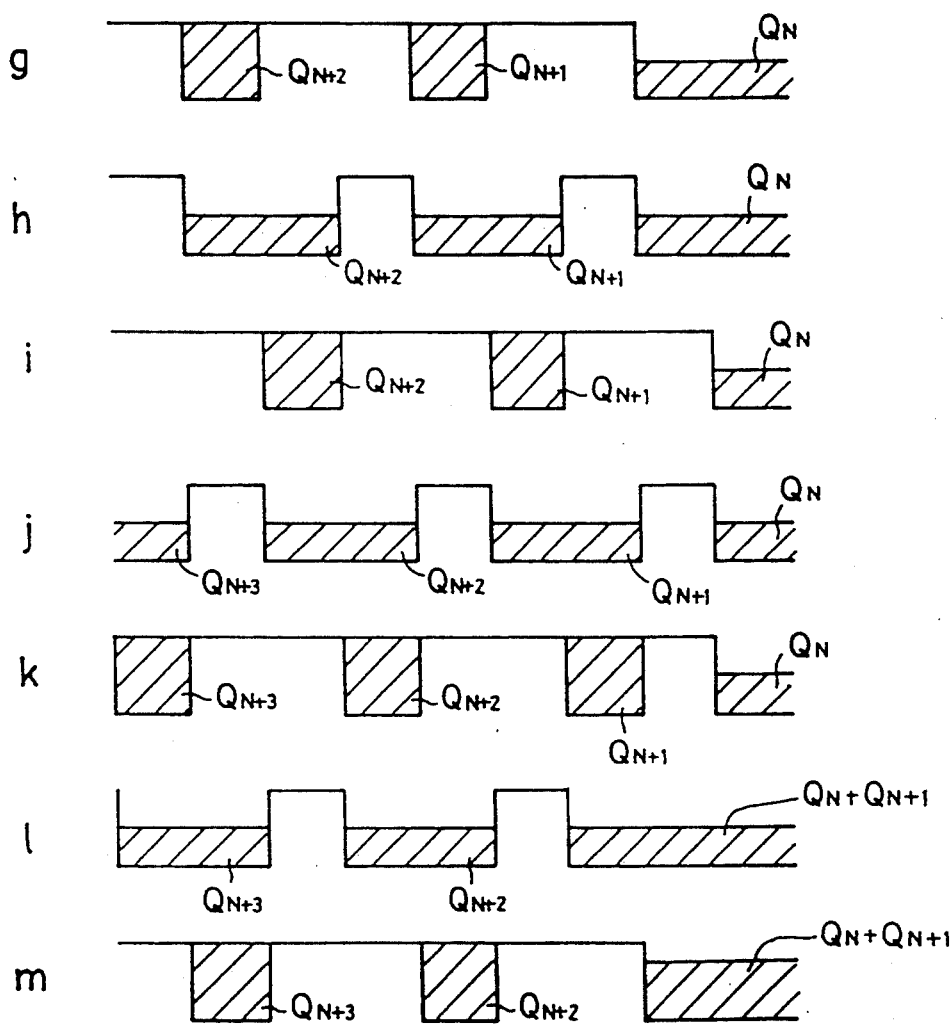

METHOD OF DRIVING A SOLID-STATE IMAGING DEVICE BY TWO-STEP SIGNAL CHARGE VERTICAL TRANSFER IN ONE HORIZONTAL BLANKING PERIOD

BACKGROUND OF THE INVENTION

1. Field of the Invention

This invention relates to a method of driving a solid-state imaging device and more particularly, to a method of driving a solid-state imaging device in a full frame reading type.

2. Description of the Prior Art

Recently, charge coupling device (CCD) image sensors offer a wide variety of applications as the imaging device of an electronic still camera in addition to the video camera to be used for home-use, industrial and broadcasting applications purpose.

Inter-line transfer CCD image sensor which is an imaging device developed for the video camera use is generally designed so that interlace motion can be effected by means of either frame storage reading method or field storage reading method. In case of the electronic still camera, however, the vertical resolution will be reduced to half with one field video signal of the interlace motion. As a result, it is structured such that one transfer step is assigned to one pixel in order that signal charges of all pixels can be simultaneously read out to be transferred independently.

FIG. 1 shows a conventional solid-state imaging device using an inter-line transfer CCD image sensor for full frame reading. In FIG. 1, when receiving an optical video signal, a photo diode 1 provided in each pixel photoelectrically converts the optical video signal into a signal charge to store. These signal charges thus stored in the photodiodes 1 all are read out simultaneously through transfer gates 3 provided in every pixel and transferred to vertical CCD registers 2 of three-phase drive in parallel and independently (inter-line transfer system). The vertical CCD registers 2 each transfers the signal charges thus received to a horizontal CCD register 4 in one horizontal blanking period of time by in an one-by-one transfer step. The horizontal CCD register 4, to which one end of each of the vertical CCD registers 2 is connected, transfers the received signal charges to an output circuit 5 provided on one end of the register 4. The output circuit 5 converts each of the signal charges thus transferred into a voltage signal in accordance with its charge quantity. In addition, the reference numeral 6 indicates an overflow drain for absorbing excess charges and unnecessary charges. In this solid-state imaging element, the overflow drain 6 can be formed in a longitudinal type structure for absorbing excess charges within the photodiode range into a substrate disposed just under such photodiode range.

FIG. 2 shows in details a structure of the vertical CCD register 2 of the solid-state imaging device shown in FIG. 1. The vertical CCD register 2 has a plurality of transfer steps each having three vertical transfer electrodes V1, V2 and V3, and a horizontal transfer electrode H2 on its one end. In this case, each transfer step is assigned by a pixel. In addition, a signal charge generated through the photodiode 1 provided by a pixel is first transferred to the vertical transfer electrode V2 of the corresponding step. In FIG. 2, three transfer steps are shown corresponding to the three photodiodes PD1, PD2 and PD3 for the simplification of explanations.

FIG. 3 is a timing chart for explaining a conventional method of driving the solid-state imaging device shown in FIGS. 1 and 2. First, the signal charges stored in the photodiodes 1 all are simultaneously read out to each of the vertical CCD registers 2 in response to a reading pulse (TG pulse) supplied to each of the vertical transfer electrodes of each vertical CCD register 2 in the vertical blanking period of time VBLK. The signal charges thus read out are transferred by parallel in an one-by-one line step to the horizontal CCD register 4 in response to a line shift pulse A in one horizontal blanking period of time HBLK. The horizontal CCD register 4 having received one line part of the signal charges from the vertical CCD registers 2 transfers them to the output circuit 5 in a successive manner.

FIG. 4 is a detailed timing chart for explaining the transfer state of signal charges of the vertical CCD register 2 in response to the line shift pulse A shown in FIG. 3, and FIG. 5 shows a transfer state of a signal charge at the times of a to g shown in FIG. 4. The line shift pulse A shown in FIG. 3 consists practically of three pulses as shown in FIG. 4, which are supplied successively to the vertical transfer electrodes V1, V2 and V3 at such a timing that is slightly shifted.

Referring to a signal charge QN read out from a photodiode PDN in response to the TG pulse, at a time of a, a voltage pulse is applied to each electrode V2 thereby to form a potential well under the electrode 2, so that the signal charge QN is stored into the potential well thus formed under the electrode V2 directly connected to the photodiode PDN as shown in FIG. 5. Next, at a time of b, a potential well is formed under the electrode V3 by a voltage pulse applied to each electrode V3, so that the signal charge QN is stored into a potential well formed under both the electrode V2 and the electrode V3 of the photodiode PDN. Then, at a time of c, the supply of a voltage to each electrode V2 is stopped, so that the potential well formed thereunder is disappeared. As a result, the signal charge QN is transferred to the potential well formed under the electrode V3 between the photodiode PDN and the horizontal transfer electrode H2.

Further, at a time of d, in response to a voltage pulse applied to each of the electrodes V1, a potential well is formed thereunder, so that the signal charge QN stored in the potential well formed under the electrode V3 between the photodiode PDN and the horizontal transfer electrode H2 is stored further in a potential well formed under the electrode V1, which means that the signal charge QN is stored in a potential well formed under both the electrode V3 and the electrode V1 adjacently disposed on the right side thereof as shown in FIG. 5. Then, at a time of e, the supply of voltage to the electrode V3 is stopped, so that the signal charge QN stored under both the electrodes V1 and V3 is moved to the potential well under the electrode V1. Subsequently, at a time of f, the voltage supply to each electrode V2 is re-started, and a potential well is formed under the electrode V2 adjacently disposed to said electrode V1 between the photodiode PDN and the horizontal transfer electrode H2, so that the signal charge QN thus stored in the potential well under said electrode V1 is further stored in the potential well formed under the electrodes V1 and V2. Also, at a time of g, the voltage supply to each electrode V1 is stopped, so that the signal charge QN stored under said electrodes V1 and V2 is moved to the potential well formed under the electrode V2. Thus, one transfer step of transferring the signal charge QN is completed.

The signal charge QN moved to the electrode V2 adjacent to the horizontal transfer electrode H2 is transferred successively to a potential well formed under the horizontal transfer electrode H2 and sent to the output circuit 5 through the horizontal CCD register 4. In addition, referring to a signal charge QN+1 read out from another photodiode PDN+1, it is transferred in the same manner that is explained above.

In the conventional method of driving a solid-state imaging device described above, signal charges are transferred through the vertical CCD registers 2 by in an one-by-one transfer step in one transfer period of time HBLK, so that the signal charges of two photodiodes 1 adjacently disposed to each other in the vertical direction cannot be added, thus making impossible to effect field storage. As a result, with such a driving method as shown above, the solid-state imaging device cannot be used for the video camera applications purpose, resulting in such a disadvantage that it is limited to be used for the still-picture camera applications purpose.

Accordingly, an object of this invention is to provide a method of being driving a solid-state imaging device capable of used not only for the still camera application purpose but also for the video camera application purpose.

SUMMARY OF THE INVENTION

A method of driving a solid-state imaging device of this invention resides in that with a solid-state imaging device, signal charges are read out simultaneously and independently from all light receiving members of the imaging device to vertical CCD registers, and then, the signal charges thus read out thereto are transferred by two-by-two vertical transfer steps in one horizontal blanking period of time.

According to the present invention, the signal charges in the vertical CCD registers are transferred by two-by-two transfer steps in one horizontal blanking period of time, and the signal charges obtained from the adjacently disposed light receiving members can be added to each other through a horizontal CCD register, so that the field storage reading can be made possible. Accordingly, the solid-state imaging device can be driven in a field storage mode that is capable of effecting interlace motion, which means that the solid-state imaging device can be used for the video camera applications purpose.

According to this invention, it is preferable that a first field and a second field are formed respectively from the reading process and the two-step transfer process to effect the interlace motion in the solidstate imaging device.

In addition, it is preferable that in the first field, at the beginning only, the signal charges read out to the vertical CCD registers are transferred by an one-by-one transfer step, and then the residual signal charges in the vertical CCD registers are transferred by two-by-two vertical transfer steps in one horizontal blanking period of time, and in the second field, the signal charges read out to the vertical CCD registers are transferred always by two-by-two vertical transfer steps in one horizontal blanking period of time.

Further in addition, said reading method and said twostep transfer method are not limited specifically, they may be selected arbitrarily as the case may be. As a result, the transfer signal (for example, voltage pulse) to be applied to a transfer electrode of each vertical CCD register is not limited to be of three-phase, four-phase, two-phase and single-phase ones can be selectively used arbitrarily.

BRIEF DESCRIPTION OF THE DRAWINGS

FIGS. 1 to 5 are diagrammatical views for explaining a conventional method of driving a solid-state imaging device, in which:

FIG. 1 is a block diagram of a generally-used full frame reading type solid-state imaging device;

FIG. 2 is a detail diagram of a vertical CCD register for effecting full frame reading in the solid-state imaging device shown in FIG. 1;

FIG. 3 is a timing chart for explaining a conventional method of driving the solid-state imaging device shown in FIG. 1;

FIG. 4 is a detailed timing chart of a line shift pulse A shown in FIG. 3;

FIG. 5 illustrates a state of transferring signal charges at the timings shown in FIG. 4;

FIGS. 6 to 12 are diagrammatical views for explaining a method of driving a solid-state imaging device of this invention, in which:

FIG. 6 is a timing chart of a second field for explaining a method of driving a solid-state imaging device according to one embodiment of this invention;

FIG. 7 is a timing chart of a first field for explaining a method of driving a solid-state imaging device according to one embodiment of this invention;

FIG. 8 is a detailed timing chart of a line shift pulse B shown in FIG. 7;

FIGS. 9 and 10 illustrate states of transferring signal charges at the timings shown in FIG. 8;

FIG. 11 is a block diagram of a full frame reading type solid-state imaging device to be used for the method of one embodiment of this invention; and FIG. 12 is a detail diagram of a vertical CCD register for effecting full frame reading in the solid-state imaging device shown in FIG. 11.

DESCRIPTION OF THE PREFERRED EMBODIMENTS

Figure 1:
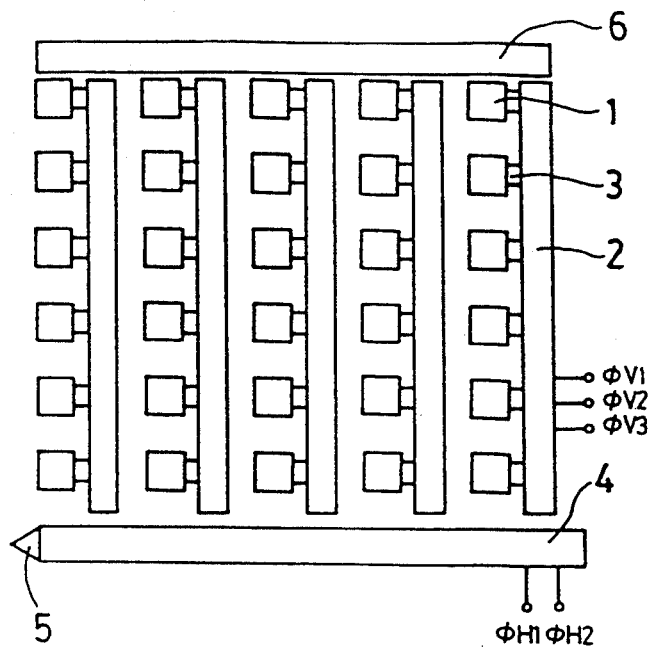
Figure 2:
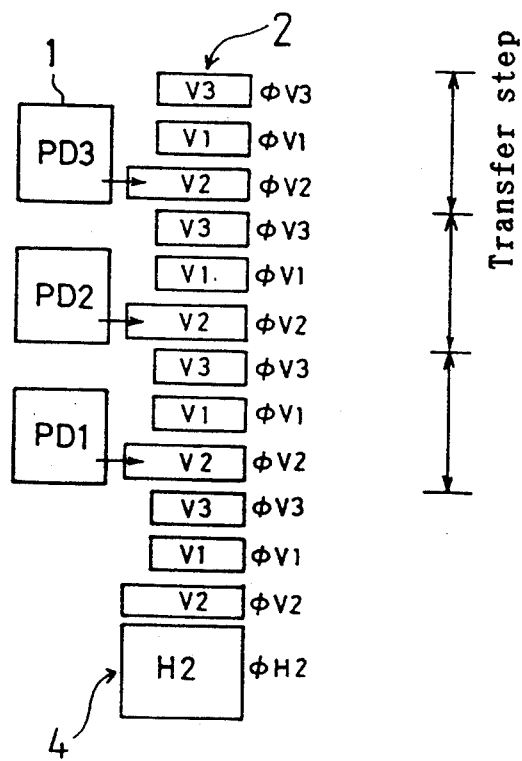
Figure 3:
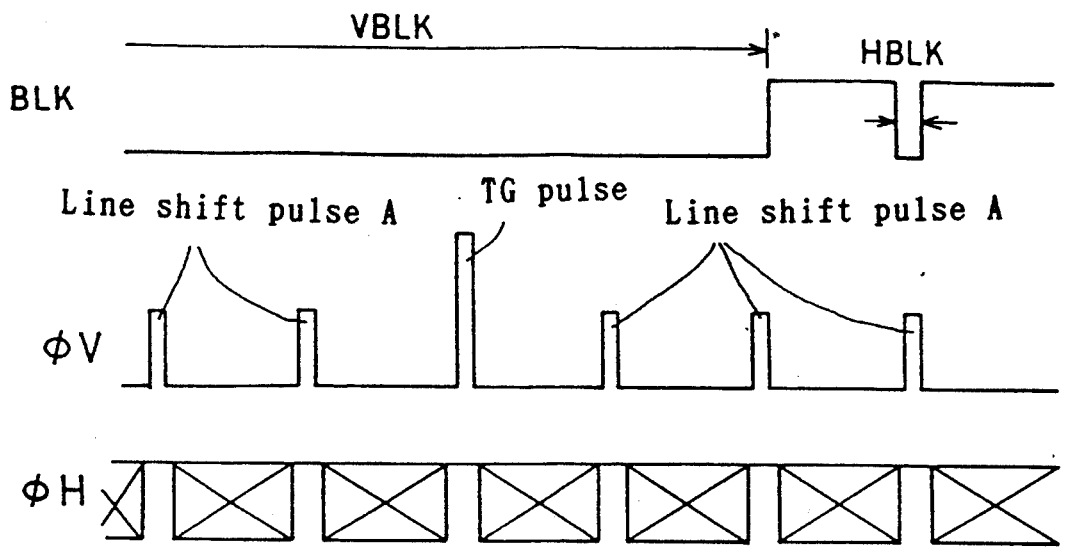
Figure 4:
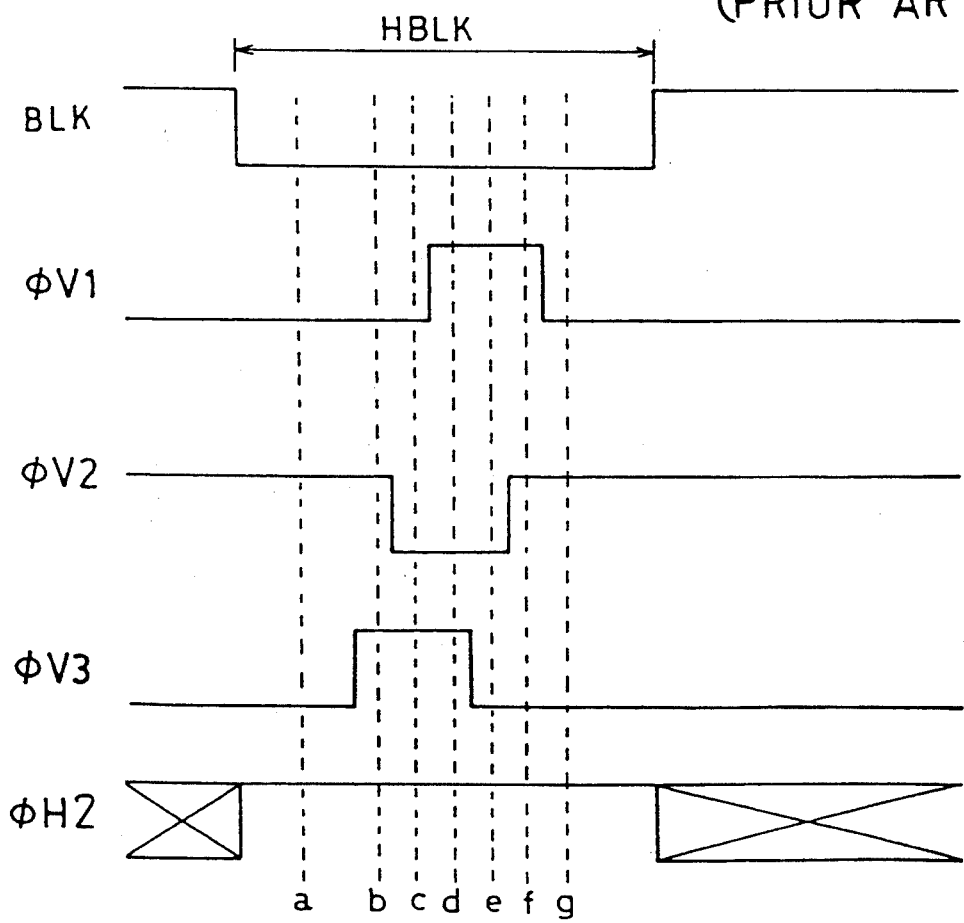
Figure 5:
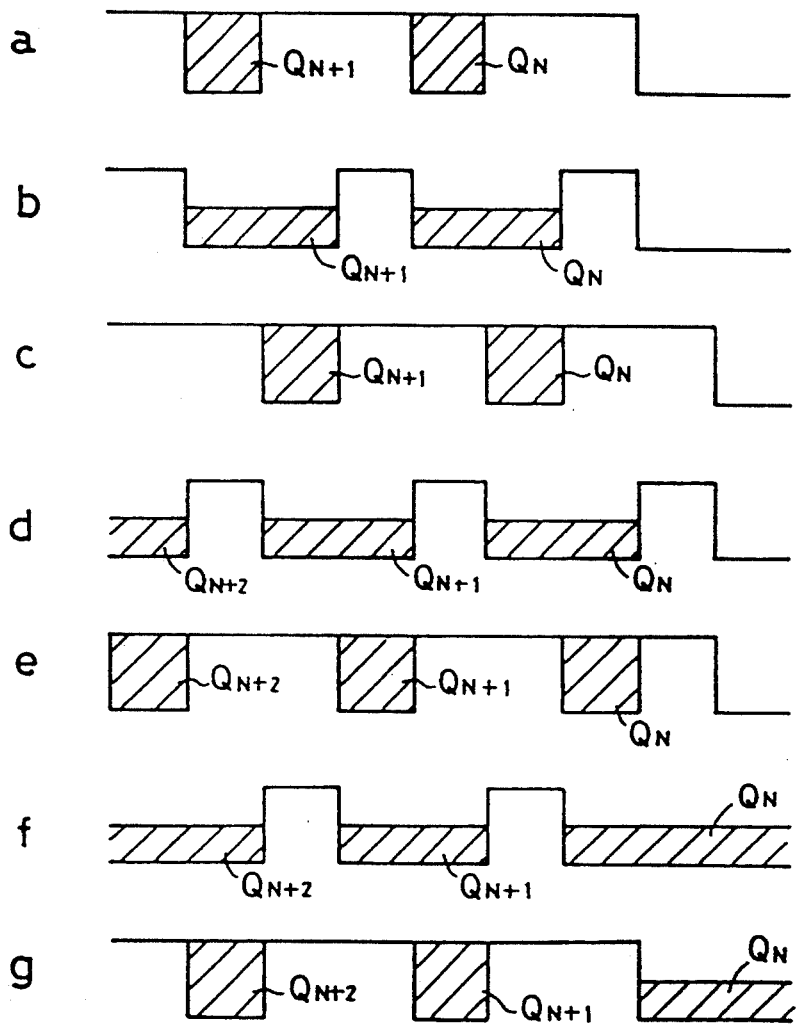
Figure 11:
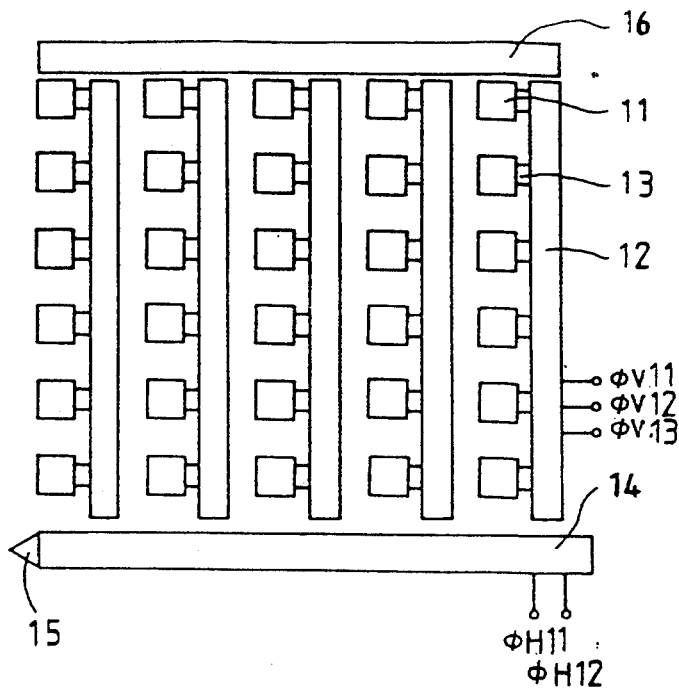
Figure 12:
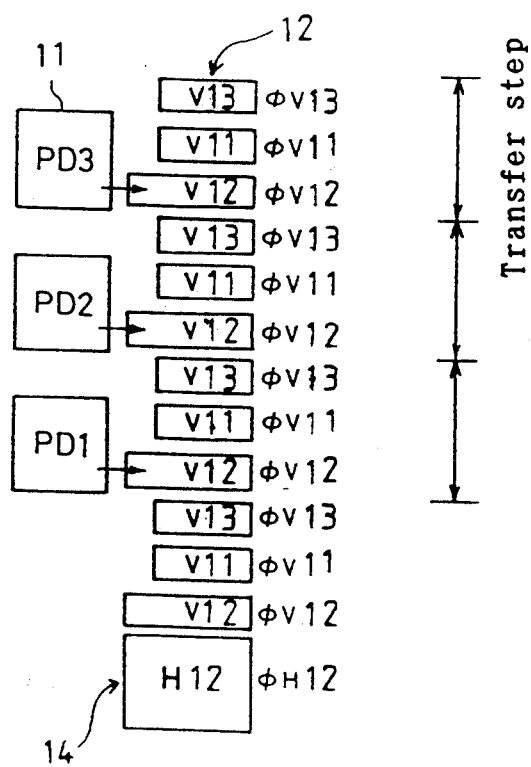

One preferred embodiment of this invention will be described below by referring to FIGS. 6 to 12. In this embodiment, a solid-state imaging device structured as shown in FIGS. 11 and 12 is used, which is of the same in structure as is shown in FIGS. 1 and 2. Namely, in FIG. 11, photodiodes 11 are provided in every pixel and photoelectrically convert optical video signal into signal charges to store. Transfer gates 13 are also provided in every pixel to read all the signal charges simultaneously and transfer them in parallel respectively to vertical CCD registers 12 of the three-phase drive. The vertical CCD registers 12 transfer the signal charges thus transferred to the horizontal CCD register 14 in a successive manner in one horizontal blanking period of time. The horizontal CCD register 14, to which one end of each of the vertical CCD registers 12 is connected, transfers the received signal charges to an output circuit 15 provided at one end of the register 14. The output circuit 15 converts thus transferred signal charges into voltage signals in accordance with their charge quantities. In addition, 16 is an overflow drain for absorbing excess charges and unnecessay charges. In this solid-state imaging device, it can be of such a longitudinal type overflow drain structure that absorbs an excess charge in a photodiode range into a substrate disposed just under the photodiode range.

In FIG. 12, the vertical CCD register 12, similar to that shown in FIG. 2, has a plurality of transfer steps each comprising three vertical transfer electrodes V11, V12 and V13, and a horizontal transfer electrode H12 connected on its one end. Each of the transfer steps has the corresponding pixel assigned, and a signal charge generated through the photodiode 11 provided in each pixel is transferred to the vertical transfer electrode V12 directly connected thereto. In FIG. 12, the three photodiodes PD1, PD2 and PD3 are shown corresponding to the three transfer steps.

Figure 6:
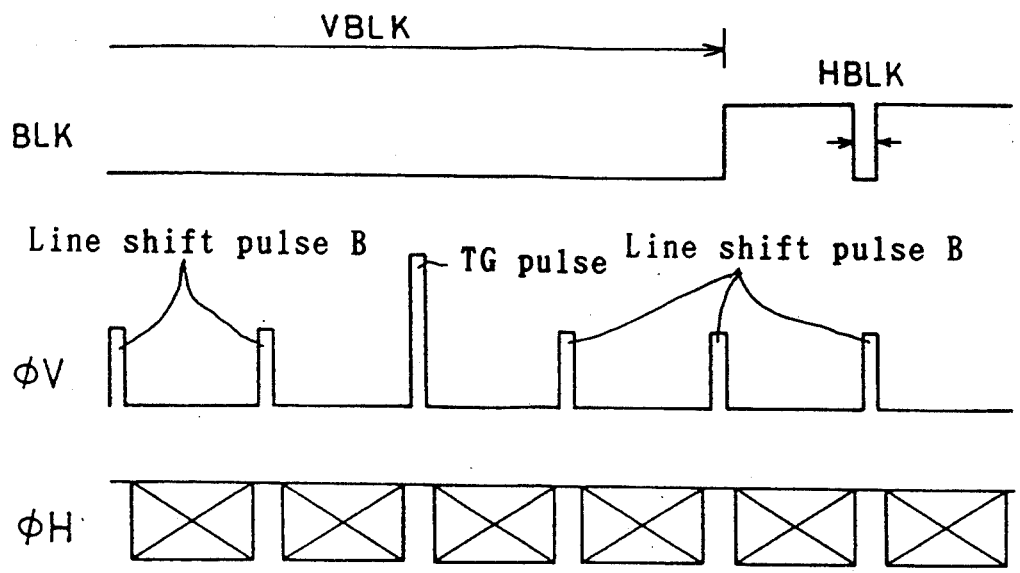
Figure 7:
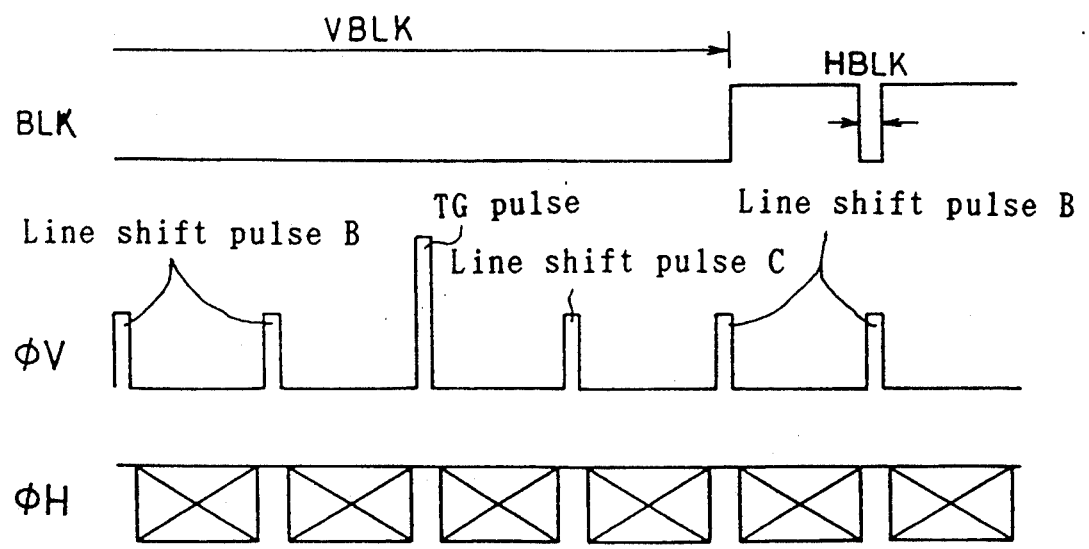
Figure 8:
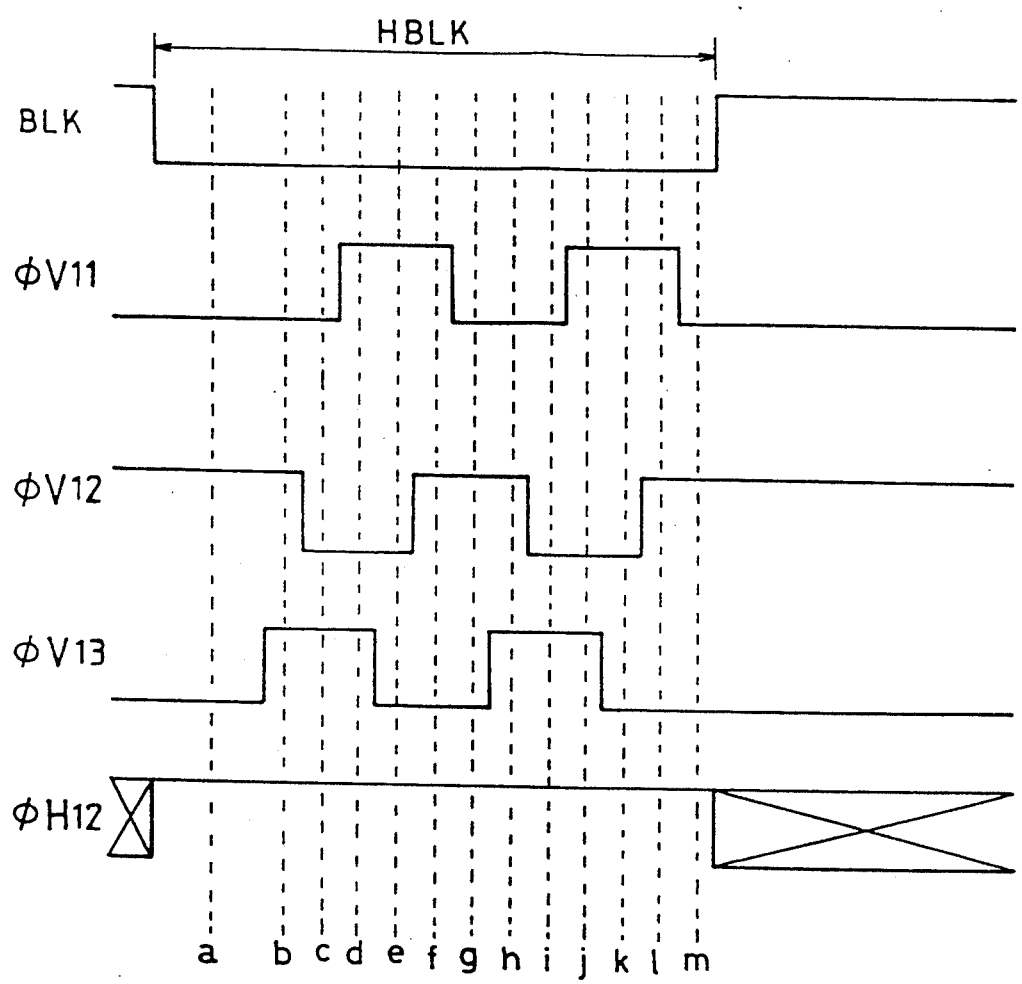
Figure 9:
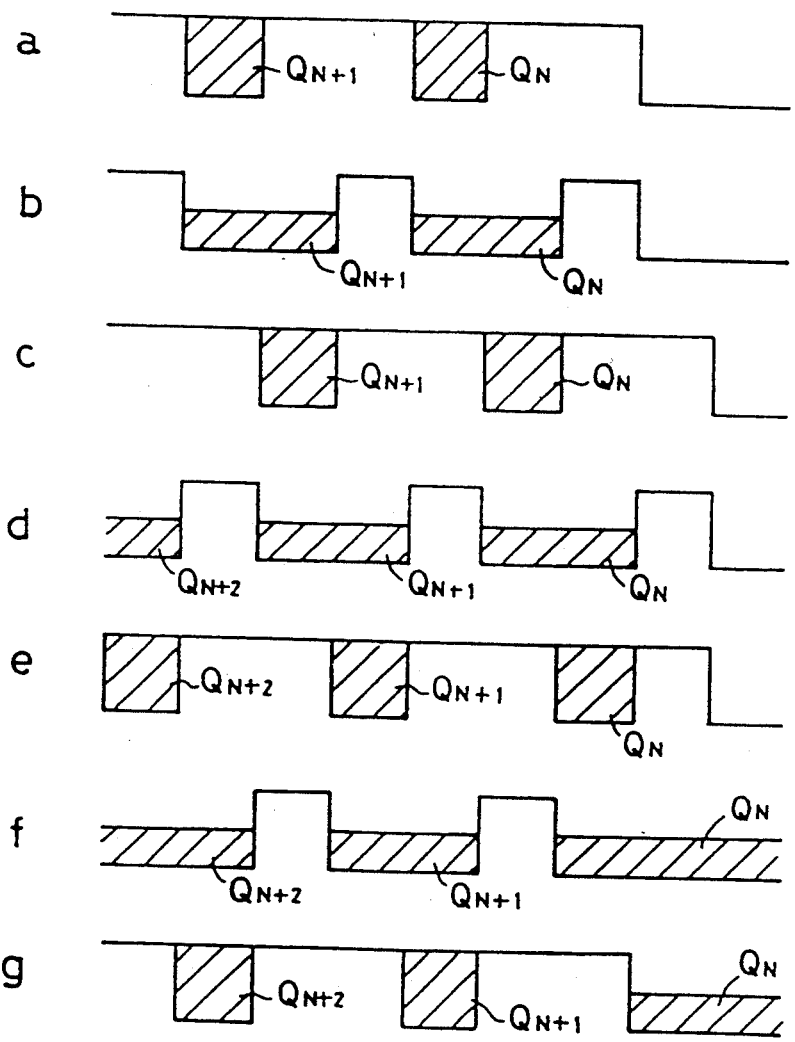

With the solid-state imaging device thus structured, the driving method will be explained below while referring to FIGS. 6 to 10. FIG. 8 is a detail timing chart for explaining the transfer state of the vertical CCD register 12 using a line shift pulse B shown in FIGS. 6 and 7, and FIGS. 9 and 10 illustrate the states of transferring signal charges at the times of a to m shown in FIG. 8. FIGS. 6 and 7 are timing charts of a second field and a first field, respectively.

The line shift pulse B shown in FIGS. 6 and 7 practically comprises, as shown in FIG. 8, three sets of pulse train which are shifted in timing slightly to each other to supply to the vertical transfer electrodes V11, V12 and V13. The first half pulse of each set of the line shift pulse B is equal to the line shift pulse A shown in the description of the prior art. As a result, the line shift pulse B corresponds to such a pulse that is obtained by following the pulse of the second half of the line shift pulse B to the line shift pulse A.

With the line shift pulse B, a signal charge read out in response to the TG pulse is transferred in the same manner as shown in the description of the prior art from the time a to the time g of FIG. 8. That is, at a time of a, the signal charge QN read out from the photodiode PDN is stored into a potential well formed under the vertical transfer electrode V12 directly connected to the photodiode PDN. Next, at a time of b, the signal charge QN stored in the potential well under said electrode V12 is stored in a potential well formed under both the electrodes V12 and V13. At a time of c, said signal charge QN is moved to the potential well under the electrode 13 between the photodiode PDN and the horizontal transferelectrode H12. Further, at a time of d, the signal charge QN stored under said electrode V13 is moved to a potential well formed under both the electrode V13 and the electrode V11 adjacently disposed on the right side thereof. Subsequently, at a time of e, said signal charge QN is moved to the potential well under the electrode V11, and at a timeof f, it is stored in a potential well formed under both the electrodes V11 and V12, and finally, at a time of g, it is moved to the potential well under the electrode V12. Thus, a first transfer step of the signal charge QN is finished.

At a time of g, the signal charge QN is being stored in the potential well formed between the horizontal transfer electrode H12 and the vertical transfer electrode V12 adjacently disposed to the horizontal transfer electrode H12, which is not transferred to the output circuit 15 up to the time when a second transfer step is finished. In addition, the potential well formed under the vertical transfer electrode V12 directly connected to the photodiode PDN has a signal charge QN+1 stored.

Next, at the time interval from h to m shown in FIG. 8, the same operation as that at the time interval from b to g is repeated as follows; As shown in FIGS. 10, at a time of h, the signal charge QN+1 stored in the potential well under the electrode V12 directly connected to the photodiode PDN is stored in the potential well formed under both the electrode V12 and the electrode V13 disposed between the photodiode PDN and the horizontal transfer electrode H12. At a time of i, the potential well formed under the electrode V12 directly connected to the photodiode PDN is disappeared, and the signal charge QN+1 is moved to the potential well formed under the electrode V13 disposed between the photodiode PDN and the horizontal transfer electrode H12. At a time of j, signal charge QN+1 is stored in the potential well formed under both said electrode V13 and the electrode V11 adjacently disposed on the right side thereof, and at a time of k, it is moved to the potential well formed under the electrode V11. Then, at a time of 1, there forms a potential well under the electrode V12 adjacent to the horizontal transfer electrode H12, so that the signal charge QN+1 is stored in the potential well formed under both said electrode V11 and said electrode V12, and at this time, added to the signal charge QN which is already stored in the potential well formed under the horizontal transfer electrode H12. At a time of m, the potential well under said electrode V11 is disappeared, so that the signal charge QN+1 is moved to the potential well under said electrode V12 adjacent to the horizontal transfer electrode H12, thus finishing the second transfer step. In addition, at this time, the potential well under the electrode V12 directly connected to the photodiode PDN has the signal charge QN+2 stored.

As explained above, in response to the line shift pulse B and in the one horizontal blanking period of time HBLK range as shown in FIG. 8, the vertical CCD register 12 transfers the signal charges of two transfer steps to the horizontal CCD register 14 in which the signal charges of two photodiodes 11 adjacently disposed to each other, that is, the signal charge QN obtained from the photodiode PDN and the signal charge obtained from the photodiode PDN+1 are added to each other.

Next, explanations will be made below on the field storage reading method of this embodiment while referring to FIGS. 6 and 7. The timing charts shown in FIGS. 6 and 7 are of a second field and a first field, respectively.

In case of the second field, as shown in FIG. 6, the signal charges are simultaneously read out from the photodiodes 11 in response to the TG pulse in the vertical blanking period of time VBLK with no effect on image thereby to transfer them to the vertical CCD register 12. Then, in response to the line shift pulse B to be supplied in the horizontal blanking period of time HBLK, the signal charges in the vertical CCD register 12 are transferred to the horizontal CCD register 14 in a successive manner as already described above. Thus, the signal charges obtained by the photodiodes 11 adjacently disposed to each other (PD1 and PD2 in FIG. 12) are added in the horizontal CCD register 14. The signal charge thus obtained by addition is sent to the output circuit 15 to convert into a voltage signal and outputted at a television rate.

In the first field, as shown in FIG. 7, first, the signal charges read out in response to the TG pulse in the vertical blanking time period VBLK are transferred by its one transfer step part in the same manner as described above in response to a line shift pulse C equal to the line shift pulse A already shown in the description of the prior art. As a result, the signal charge of the photodiode 11 nearest the horizontal CCD register 14 (PD1 in FIG. 12) is transferred to the horizontal CCD register 14 and sent directly to the output circuit 15 without waiting the next transfer.

Next, in response to the line shift pulse B supplied successively to the line shift pulse C, in the horizontal blanking time period HBLK, the residual signal charges in the vertical CCD register 12 are successively transferred in by two-by-two transfer steps as described above to the horizontal CCD register 14 in which the signal charges of the adjacently disposed photodiodes 11 (PD2 and PD3 in FIG. 12) are added. The signal charge thus obtained by addition is sent to the output circuit 15 to be outputted at a television rate.

As explained above, according to this invention, the signal charges in the vertical CCD registers 12 are transferred by two-by-two transfer steps in one horizontal blanking period of time, and the signal charges of the adjacently disposed photodiodes 11 are added in the horizontal CCD register 14, thus making possible to effect the field storage reading of a full frame reading type solid-state imaging device. Accordingly, this invention makes it possible to apply the full frame reading type solid-state imaging device not only to a still camera but also to a video camera, largely contributing to the expansion of the application field of such solid-state imaging device.

What is claimed is:

1. A method of driving a solid-state imaging device comprising a plurality of light receiving members arranged in a matrix in horizontal and vertical directions, a plurality of vertical CCD registers for reading signal charges received through said plurality of light receiving members to transfer signal charges in the vertical direction, and a horizontal CCD register disposed at one end of said plurality of vertical CCD registers to transfer the signal charges received from said plurality of vertical CCD registers to an output circuit member, said method comprising:

a first step for reading out the signal charges from all of said plurality of light receiving members simultaneously and independently to said plurality of vertical CCD registers; and a second step for transferring the signal charges thus read out to said plurality of vertical CCD registers by two vertical transfer steps in one horizontal blanking period of time in such a fashion that in a first vertical transfer step signal charges from one row of said light receiving menber in said vertical CCD registers are transferred to said horizontal CCD register and in a second vertical transfer step signal charges from another row of said light receiving menber in said vertical CCD registers are transferred to said horizontal CCD register and added to the signal charges transferred in the first vertical transfer step and the added signal charges in said horizontal CCD register are then transferred to said output circuit member so as to form a first field and second field to provide an interlace motion in the solid-state imaging device.

2. A method of driving a solid-state imaging device as claimed in claim 1, wherein a first field and a second field is respectively formed of said first step and second step, thereby to effect said solid-state imaging device to provide an interlace motion.

3. A method of driving a solid-state imaging device as claimed in claim 2, wherein in the said first field, at the beginning only, the signal charges read out to said plurality of vertical CCD registers are transferred by one vertical transfer steps, and then, the residual signal charges in said plurality of vertical CCD registers are transferred by said two vertical transfer steps in said fashion in one horizontal blanking period of time, and in said second field, the signal charges read out to said plurality of vertical CCD registers are transferred by said two vertical transfer steps in one horizontal blanking period of time.

* * * * *